W. D. Terry.
Iron Pavement.
Nº 3,168.                                        Patented Jul. 12, 1843.
Fig. 1.
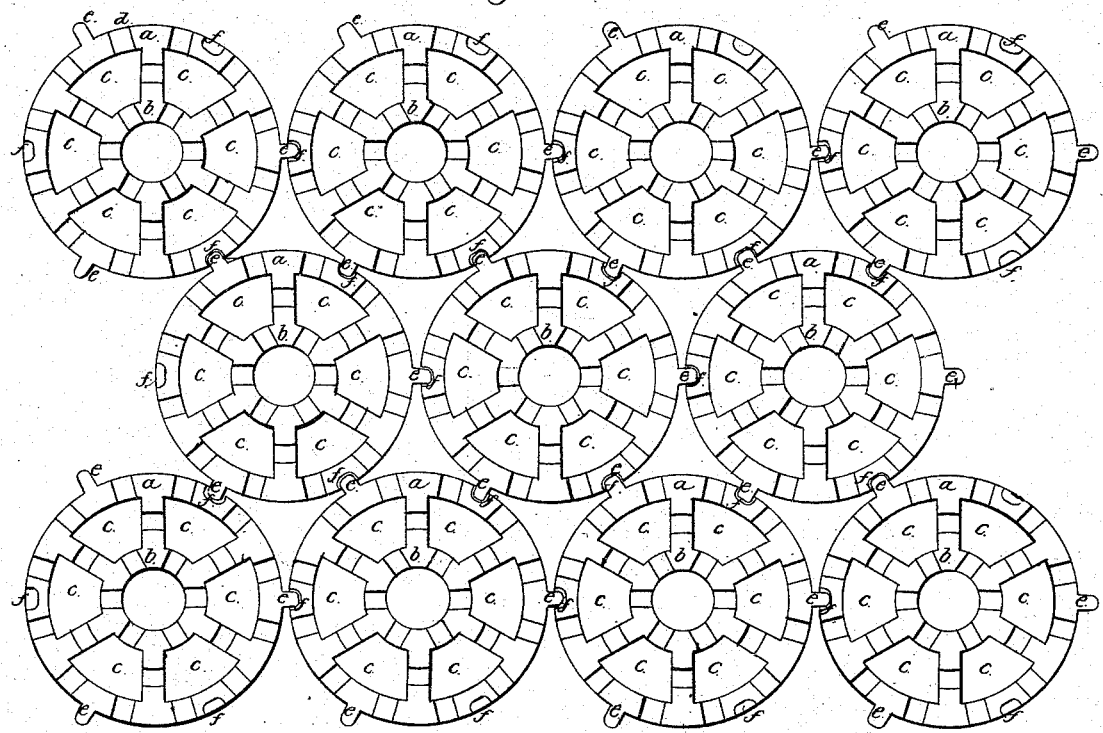
Fig. 2.
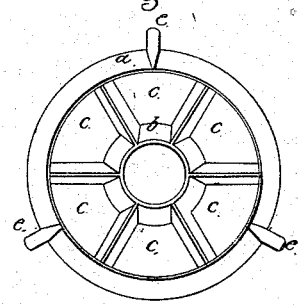
Fig. 3.
Fig. 4.
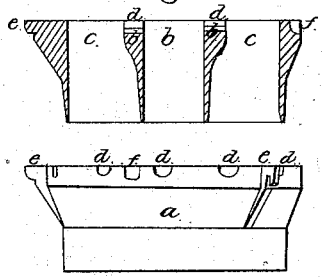
Fig. 5.
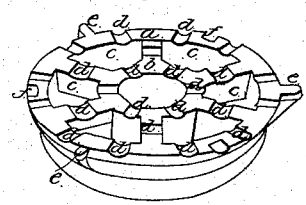
Witnesses:
James W. Marcy
Cornelius E. Brown
Inventor:
W. D. Terry

UNITED STATES PATENT OFFICE.

WM. D. TERRY, OF BOSTON, MASSACHUSETTS.

CAST-IRON PAVEMENT FOR STREETS.

Specification of Letters Patent No. 3,168, dated July 12, 1843.

*To all whom it may concern:*

Be it known that I, WILLIAM D. TERRY, of Boston, in the county of Suffolk and State of Massachusetts, have invented a new and Improved Mode of Using Iron in the Pavement of Streets, of which the following is a full and exact description.

The nature of my invention consists in covering the surface of a street with boxes made of iron of any convenient form and size, divided into sections, (which sections are to be so small as not to admit the hoof of a horse) by compartments of iron which are so arranged as to strengthen the whole, and together with the rim of the boxes are grooved in such a manner as will most effectually prevent the feet of horses or wheels of carriages from slipping. The boxes are keyed or linked together as is shown in Figure 1, of the drawings annexed and the interstices or sections are to be filled with any composition which may be procurable in the section of country where the pavement may be used and which may be found suitable to the purpose.

Among the compositions which may be used I name asphaltum, and a composition made of stone and shells broken small and mixed with hydraulic or other cement.

To enable persons skilled in the art to manufacture and make use of my invention I now proceed to describe the manner of its construction and its operation, reference being had to the annexed drawings, making a part of this specification, in which—

Fig. 1, is a bird's-eye view of a portion of the pavement as it appears when laid and ready to be filled with the cement or composition. Fig. 2, shows that part of a box which rests upon the earth. Fig. 3, is a transverse section. Fig. 4, a longitudinal elevation, and Fig. 5, a perspective view.

The form and size I believe may combine the greatest advantages with the fewest disadvantages is that represented by the annexed drawings. It consists of a circle of cast-iron (*a*,) five inches in height about one inch in thickness at the top and twelve inches in diameter inclosing a smaller circle (*b*,) of the same height and thickness and five inches in diameter; the intermediate space between the outer and inner circles is divided into six sections (*c*,) by as many compartments of cast-iron; every part of the box preserves the same thickness as at the top for the distance of about one inch below the surface, then gradually diminishes in thickness to the bottom.

The whole surface of the box is grooved as is shown in Fig. 5, at *d*, *d*, of the annexed drawings, in order to make the pavement when laid, rough and unlikely to cause slipping. At equidistant points on the outer edge of the box are three keys (*e*,) supported by shoulders and set off in such a manner as to prevent the rims of the boxes from coming in immediate contact with each other. At equidistant points on the outer edge of the box are also three commissures (*f*, *f*,) for a key from each of the adjoining boxes to lie in. These keys and commissures are so arranged around the box that when laid the several keys of each box nest each in a commissure of one of three adjoining boxes, while its commissures in turn support each a key, from one of three other boxes laid between the first three and connected in the same manner with them. Thus every box rests upon the ground and is also supported by three others, while it in turn is held down and firm in its place by three other boxes which it also aids in supporting. Thus the whole pavement is firmly linked together and it becomes impossible for any one box or more to rise above or settle lower than those around it.

Fig. 1, of the annexed drawing shows a number of the boxes thus connected. Each box is cast entire from a wooden model, one of which castings is herewith sent as a model, of which Fig. 5 is a perspective view showing the manner in which the keys, commissures, and compartments are arranged, and in which the surface is grooved. Fig. 4, is a longitudinal elevation showing the depth of the box. Fig. 3, is a transverse section, and Fig. 2, the reverse or bottom of the box looking through, and both serve to show the manner in which the thickness of the iron diminishes toward the bottom.

What I claim as my invention and desire to secure by Letters Patent is—

1. The manner of using iron in the pavement of streets by means of boxes connected by flanges or keys, and commissures and divided into small sections which leave openings or interstices as above described and shown in the drawings annexed; to be filled inside and between the rims with any composition which may be best adapted to the purpose.

2. Using for that purpose boxes of any form, divided into sections in any manner which will produce the intended effect.

W. D. TERRY. [L. S.]

In presence of—
　JAMES W. MARCY,
　E. HOBART.